United States Patent

[11] 3,543,728

[72] Inventor Floyd E. Buschbom
   Long Lake, Minnesota
[21] Appl. No. 683,274
[22] Filed Nov. 15, 1967
[45] Patented Dec. 1, 1970
[73] Assignee Van Dale Corporation
   Long Lake, Minnesota
   a corporation of Minnesota

[54] MULTIPLE LOT BUNK FEEDER
   24 Claims, 9 Drawing Figs.
[52] U.S. Cl. .................................................. 119/52,
   119/56
[51] Int. Cl. ........................................................ A01k 05/00
[50] Field of Search............................................. 119/52, 56,
   51.11; 222/412, 482; 198/64

[56] References Cited
UNITED STATES PATENTS
3,292,585  12/1966  Buschbom et al. ............ 119/52
3,325,055  6/1967  Marshall....................... 119/56X Primary Examiner—Hugh R. Chamblee
Attorney—Burd, Braddock & Bartz ABSTRACT: A bunk feeder for selectively depositing feed in one or more separate feeding locations. The bunk feeder has an auger for transporting feed into an elongated reservoir over a feed bunk. Dump control switches cooperating with gear head motors operate to open and close gates located along the bottom of the reservoir to dump feed into the feed bunk. Located below the gates is an upright diverter board movable with a cable and winch control to selectively deflect the dumped feed to opposite sides of the feed bunk.

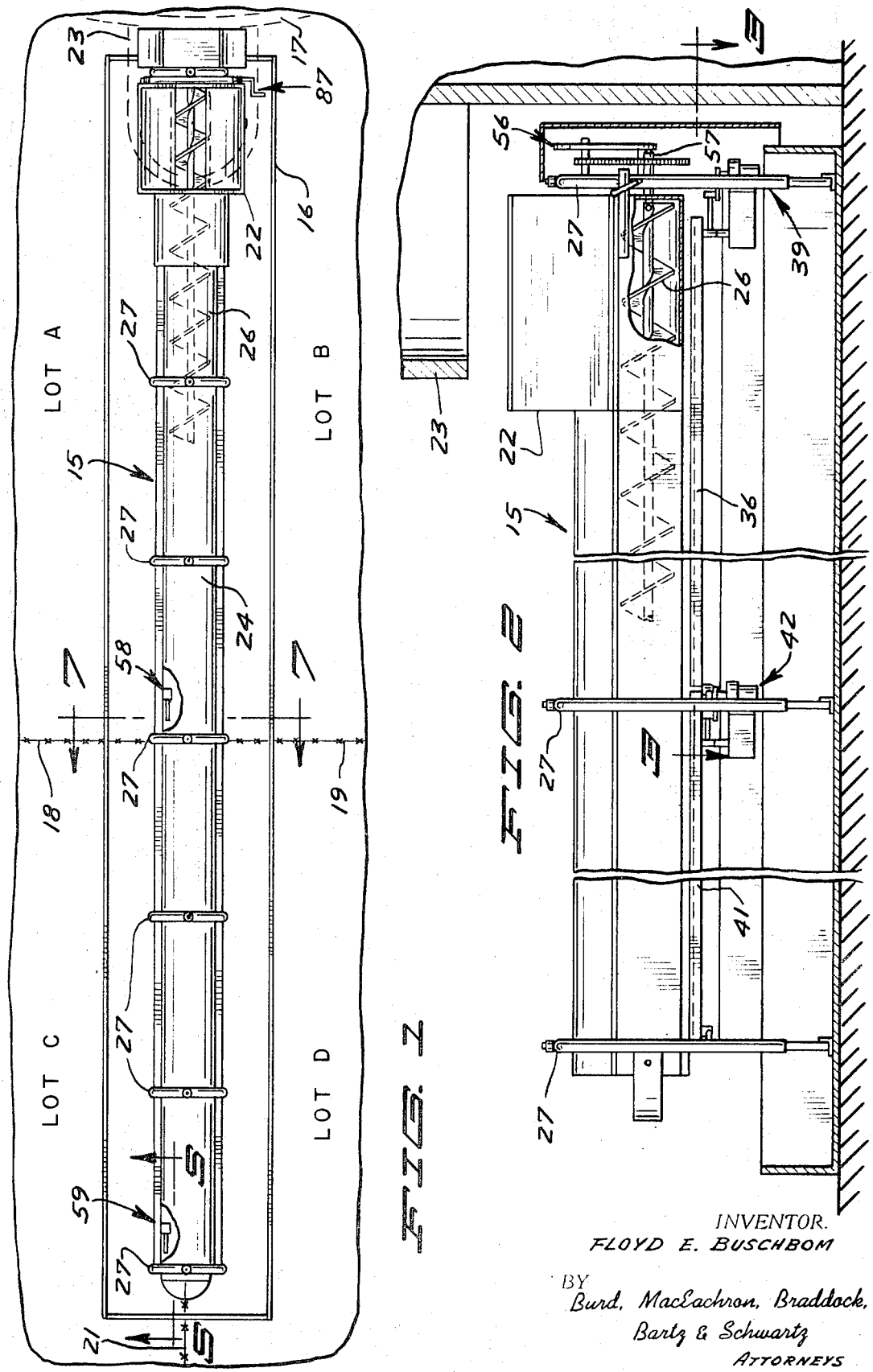

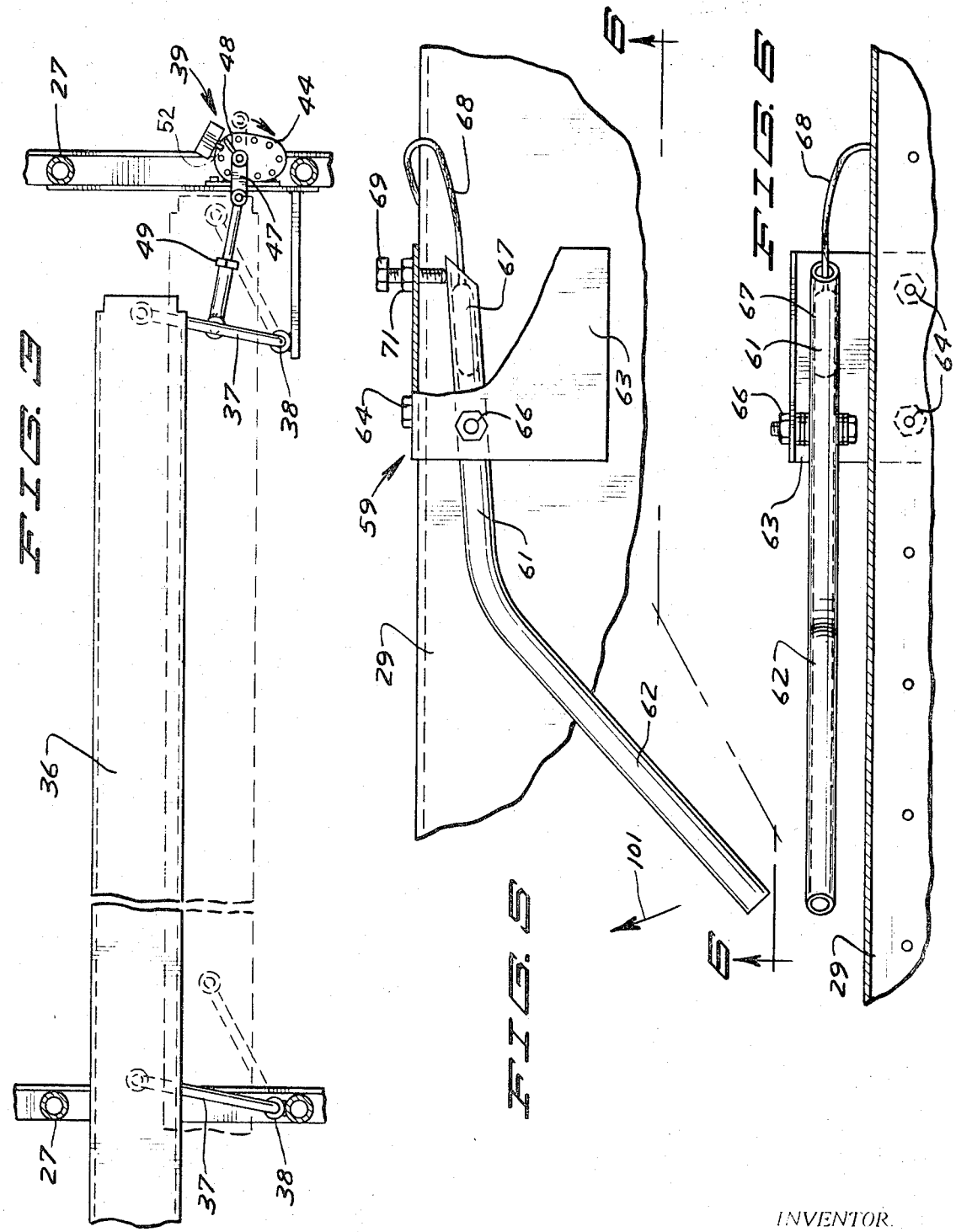

INVENTOR.
FLOYD E. BUSCHBOM

BY Burd, MacEachron, Braddock,
Bartz & Schwartz
ATTORNEYS

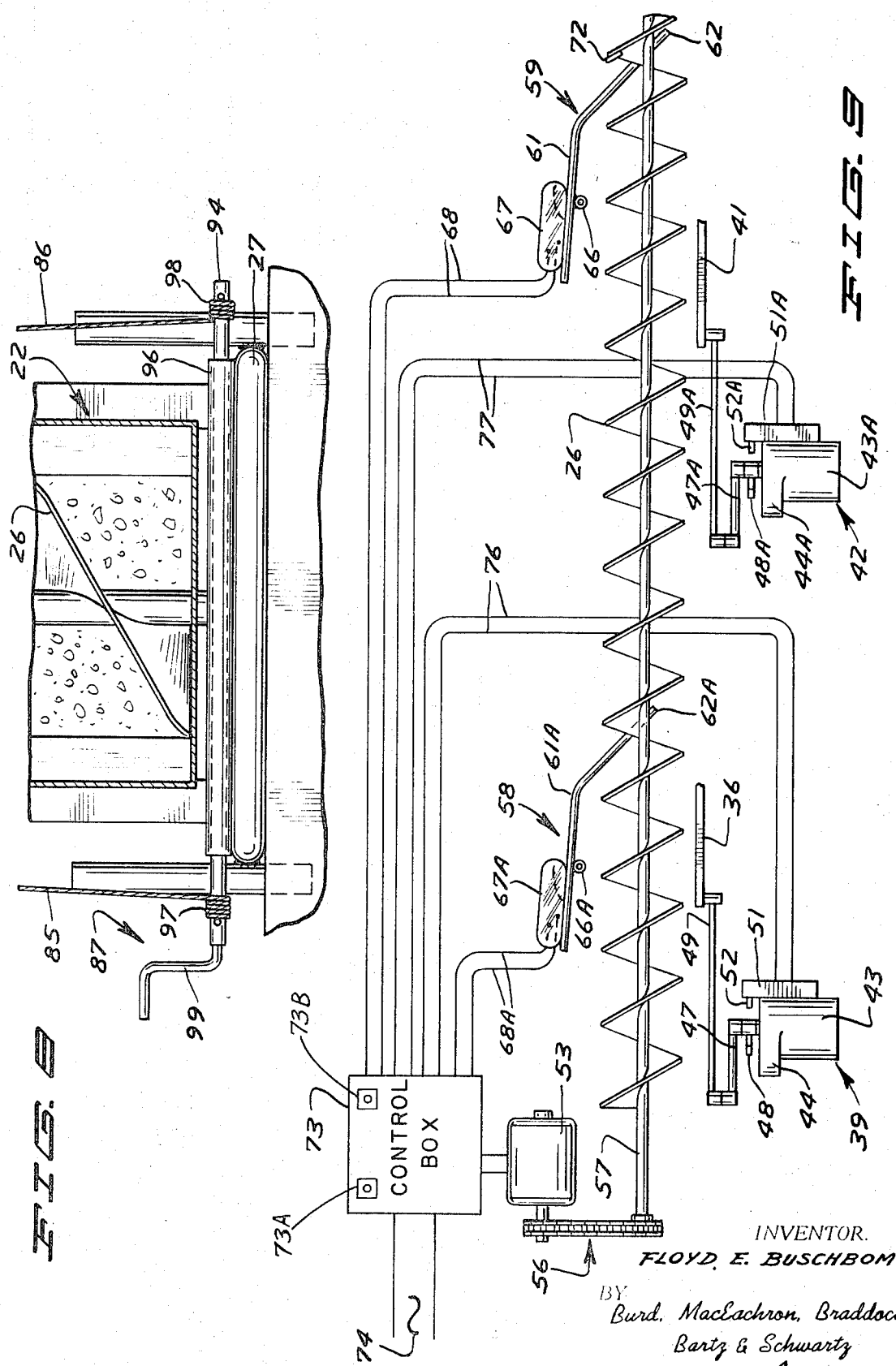

3,543,728

1

MULTIPLE LOT BUNK FEEDER

BACKGROUND OF INVENTION

In some cattle feeding operations it is desirable to separate the cattle into individual feeding lots according to the number and type of cattle and the feeding program for the cattle. Heretofore, bunk feeders have been designed to either feed cattle in a single lot or two lots, one on either side of the feed bunk. Additional bunk feeders are required if more feedlots are to be supplied with feed. In some bunk feeders, separate time controls are used in conjunction with movable doors to dump the feed into a feed bunk. These timing controls can be regulated to vary the amount and length of feed deposited or discharged in the feed bunk. In other bunk feeders, as shown in the U.S. Pat. to Buschbom No. 3,318,287, a transverse door pivotally mounted on the trailing end of the bunk feeder carries a mercury switch used to actuate a clutch to drive the dump gate to open and closed positions. The length of the feed deposited in the feed bunk cannot be controlled with this type of bunk feeder. The bunk feeder of the present invention is operable to deposit different types of feed in any one to four or more separate feeding locations. The amount of feed dumped in each location can be varied. The bunk feeder is also versatile in use, easy to operate, and requires a minimum of repair and maintenance.

SUMMARY OF INVENTION

The invention relates to a dump control system for a bunk feeder having movable gates for dumping feed into a feed bunk extended into a plurality of feeding lots. Separate drive means individually move the gates from closed to open positions allowing feed to fall into one or more sections of the feed bunk. Control means selectively actuate the drive means to dump feed into a selected part of the feed bunk. Located below the dump gates is a movable diverter board connected to a cable and winch control used to change the position of the diverter board to selectively direct the feed discharged by the feeder to opposite sides of the feed bunk.

IN THE DRAWINGS

FIG. 1 is a plan view of the bunk feeder of the invention extended into four feedlots;

FIG. 2 is a foreshortened side view of the bunk feeder of FIG. 1 with portions shown in section;

FIG. 3 is an enlarged sectional view taken along the line 3-3 of FIG. 2;

FIG. 5 is an enlarged sectional view taken along the line 5-5 of FIG. 1;

FIG. 6 is a sectional view taken along the line 6-6 of FIG. 5;

FIG. 8 is a sectional view along the line 8-8 of FIG. 4; and

FIG. 9 is a diagrammatic view of the electrical control system for the bunk feeder of FIG. 1.

Figure 7:
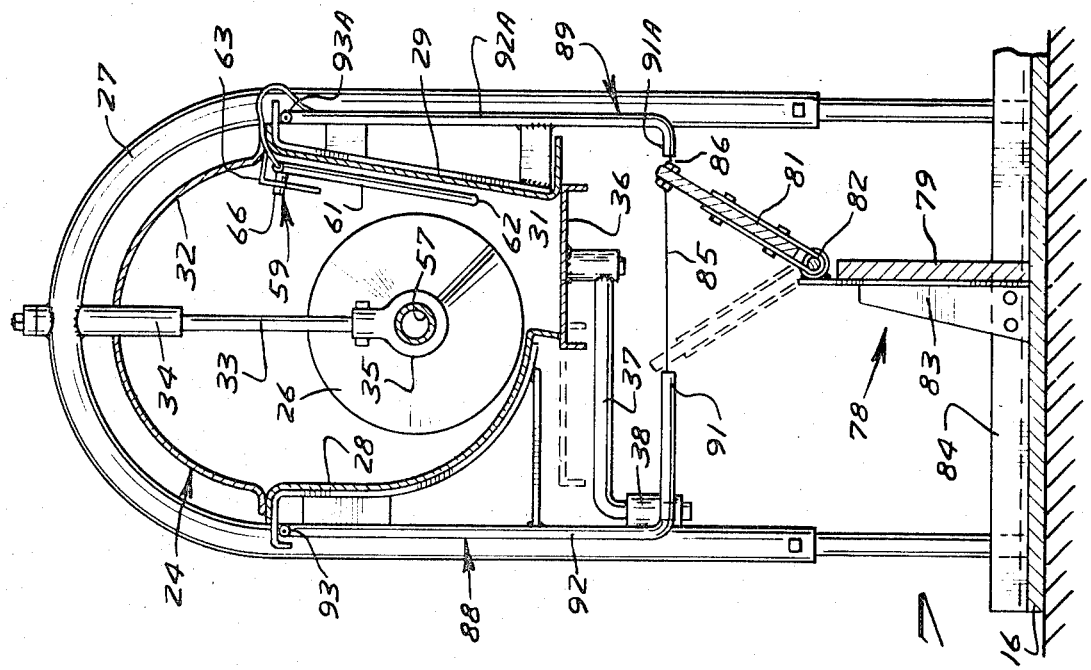
FIG. 7 is an enlarged sectional view taken along the line 7-7 of FIG. 1.

Referring to the drawings, there is shown in FIG. 1 the bunk feeder of this invention indicated generally at 15 mounted on an elongated feed bunk 16. The bunk feeder 15 and bunk 16 extend linearly away from a silo 17 or similar feed storing structure outwardly into a plurality of feedlots, indicated as lot A, lot B, lot C and lot D, separated from each other by fences or barriers 18, 19 and 21. The feedlots are used to confine cattle which may be of different numbers and types and on different rations depending on the age and feeding program of a particular group of cattle.

Slidably mounted on the inlet or forward end of bunk feeder 15 is an upright hopper 22 for receiving feed from a silo chute 23. Hopper 22 is slidably mounted on the feeder housing in a manner shown in U.S. Pat. No. 3,318,287, to provide an access into the bottom of the silo chute 23.

Bunk feeder 15 has an elongated linear troughlike housing 24 enclosing the linear conveyor 26, shown as an auger. A plurality of spaced stands 27 support the housing 24 and conveyor 26 on the feed bunk 16. As shown in FIG. 7, housing 24 has a first curved sidewall 28 spaced from a second upwardly and outwardly inclined sidewall 29 to form a reservoir space 31 between the sidewalls. Sidewalls 28 and 29 are secured to the downwardly extended legs of the inverted U-shaped stands 27. The top of the housing is closed with an inverted arcuate cover 32 mounted on the tops of the sidewalls 28 and 29. Conveyor 26 is held in a spaced relation with respect to sidewalls 28 and 29 by a suspension rod 33 movably mounted in an upright guide 34 secured to the midportion of stand 27. The bottom of rod 33 is attached to a bearing 35 surrounding the central shaft of conveyor 26. The suspension rod 33 and upright guide 34 follow the floating suspension of U.S. Pat. No. 3,292,585. Each of the stands 27 has an identical floating suspension for the conveyor and are used to support the sidewalls 28 and 29.

Movably positioned below the elongated reservoir space 31 is a gate or closure member 36 carried on a plurality of arms 37 used to support the gate 36 for linear movement to open and closed positions relative to the reservoir space 31. The inner ends of arms 37 are rotatably carried in upright sleeves 38 mounted on the stands 27 whereby the gate swings linearly and pivots about a plurality of upright axes. A drive mechanism indicated generally at 39 is operatively connected to the gate to swing the gate between open and closed positions. The outer end of bunk feeder 15 has a separate gate or closure member 41 movably mounted for linear movement between open and closed positions on a plurality of arms in the same manner as gate 36. A separate drive mechanism indicated generally at 42 is operative to move gate 41 between open and closed positions to dump feed into the outer feedlots C or D. Drive mechanisms 39 and 42 are identical in structure and operation. The following description is limited to drive mechanism 39. Corresponding parts of drive mechanism 42 are identified with the same reference numbers having the suffix A.

Figure 4:
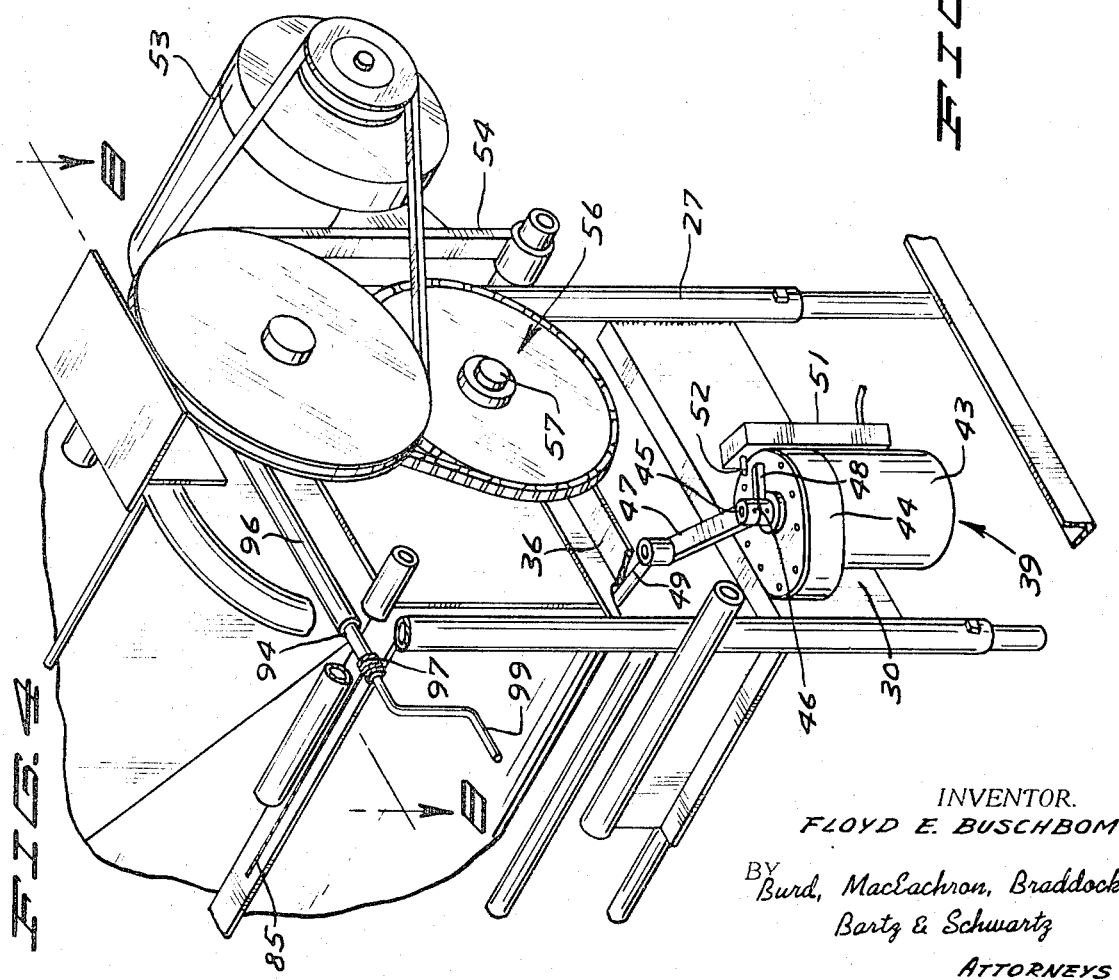
FIG. 4 is a perspective view of the drive end of the bunk feeder of FIG. 1.

Referring to FIG. 4, drive mechanism 39 comprises an electric motor 43 having a gear head 44 mounted on a transverse upright plate 30 secured to the legs of stand 27. Projected upwardly from the gear head 44 is a drive shaft 45 carrying a crank arm 47 and an outwardly projected spring finger 48. Separate sleeves positioned about shaft 45 and adjustably secured thereto with set screws 46 adjustable, mount the crank arm 47 and spring finger 48 on the shaft. A link 49 is pivotally connected to the outer end of crank arm 47 and to the adjacent or front arm 37 supporting the gate 36. On rotation of drive shaft 46, crank arm 47 and spring finger 48 rotate to pivot gate 36 to an open position as shown in broken lines in FIG. 3 and back to the closed position as shown in full lines. Secured to the side of gear head 44 is housing 51 enclosing a motor control switch (not shown) connected to a source of electric power. Projected from the top of housing 51 toward drive shaft 46 is a switch trigger 52 engageable with the spring finger 48 to disengage the power from the motor 43 by actuating the motor control switch to the off position on each revolution of the drive shaft 46. In this manner the gate 36 will move only one cycle from a closed position to the open position and back again to the closed position. The closed position of the gate may be varied by adjusting the location of finger 48.

Conveyor 26 is an auger driven by a motor 53 mounted on the side of the front stand 27 by motor mount 54. A power transmission assembly indicated generally at 56 drivably connects the motor 53 with the shaft 57 of the auger. The motor mount as well as the power transmission assembly including belt and pulley and gear train drives may be the same as the bunk feeder drive mechanism for the auger shown in U.S. Pat. No. 3,318,287.

Returning to FIG. 1, a pair of dump control switch assemblies indicated generally at 58 and 59 mounted on the housing 24 extend into the reservoir space adjacent the side of conveyor 26. The switch assembly 58 is located in the midportion of the feeder while the switch assembly 59 is located adjacent the terminal end of the feeder. Both switch assembly 58 and 59 are movably mounted on the side of the feeder housing to vary the quantity of feed which can be dispensed from the front and rear sections of the bunk feeder and the entire bunk feeder into the feed bunk 16. Switch assemblies 58 and 59 are identical in structure and operation. The following description is limited to the switch assembly 59 shown in detail in FIGS. 5 and 6. Corresponding parts of switch assembly 58 are identified with the same reference numbers having the suffix A.

Switch assembly 59 comprises an obtuse angular shaped actuator arm 61 having a downwardly and rearwardly extended tail portion 62. Actuator arm 61 is a bent tubular rod. The upper portion of the actuator arm 61 is located between an angle bracket 63 and the sidewall 29. A plurality of fasteners 64 secure the bracket 63 to the top of sidewall 29. Fasteners 64 are removable so that the bracket can be moved in a number of positions along the wall 29 thereby vary the longitudinal location of the actuator arm 61. FIG. 6 shows wall 29 with a plurality of holes for accommodating the bolts 64. A transverse pivot bolt 66 pivotally mounts the upper end of lever 61 to the side of bracket 63. Located within the forward portion of the tubular rod forming the actuator arm 61 is an elongated mercury switch 67 connected to a line 68 leading to a control box for the feeder. Threaded through the top portion of bracket 63 adjacent the upper end of lever 61 is an upright threaded stop 69 carrying locknut 71. The stop 69 is adjustable to change the elevation of the lower end of arm 61.

As shown in FIG. 9, the auger conveyor 26 has a clip 72 clamped to the conveying side of the flight and adjacent the actuator lever 61. The clip is used as a material agitator for grain and other fine feeds to insure the tripping of switch 67.

FIG. 9 shows the schematic diagram of the dump control system for the bunk feeder. A master control box 73 having a plurality of control switches and a timer (not shown) is used to control the operation of motor 53 and the sequential action of the dump control system of the feeder. Control box 73 also has a pair of manually operated switches 73A and 73B for separately actuating the dump motors 43 and 43A so that the operator can dump either or both sections of the feeder without the use of dump switches 58 and 59. Control box 73 is connected to a conventional source of an electrical power 74 and by lines 76 and 77 to the controls within the housings 51 and 51A of the drive mechanisms 39 and 42 respectively. The mercury switches 67 and 67A are connected with lines 68 and 68A to the control box 73.

With switch assembly 58 active feed moved into the reservoir in the forward section of the bunk feeder will raise arm 61A actuating mercury switch 67A. This will signal the controls for motor 43 to supply the motor with power with the result that motor 43 through gear head 44 and crank arm 47 moves the gate 36 to the open position and back again to the closed position. Control box 73 can be set to inactivate switch assembly 58 so that the feed moved by conveyor 26 will be carried all the way to the terminal end of the bunk feeder activating the switch 67 by pivoting the actuator arm 61. Switch 67 actuates the controls for motor 43A which on operation dumps feed from the outer portion of the bunk feeder by moving gate 41 to the open position. With gate 41 open and gate 36 closed the feed in the rear section of the bunk feeder will drop into the bunk and mercury switch 67 will return to the off position. As soon as the finger 48A engages the switch trigger 52A motor 43A will be turned off thereby holding gate 41 in the closed position. The control box can be set to inactivate switch assembly 58 and switch assembly 59 coupled to both motors 43 and 43A so that switch 67 will control the opening of both gates 36 and 41.

As shown in FIGS. 2 and 7, positioned below the feeder housing 24 is a diverter board indicated generally at 78 for selectively directing the dumped feed to the opposite sides of the feed bunk 16. As shown in FIG. 7, diverter board assembly 78 comprises an upright partition or board member 79 extended longitudinally under the gates 36 and 41. A swingable diverter board 81 extended linearly adjacent the top of the upright board member 79 is secured to a longitudinal hinge 82 mounted on the top of an upright support 83. A plurality of hinges and upright supports are used to mount the swingable diverter board 81 below the feed discharge opening between side members 28 and 29. Upright supports 83 are secured to a cross member 84 resting on the bottom of the bunk 16. The upright board member 79 is secured to the support 83. The diverter board 81 pivots on the hinges 82 to left and right positions as shown in full and broken lines to selectively divert or direct feed discharge from the housing 24 to the opposite sides of the feed bunk 16.

The swingable diverter board 81 is moved to its selective inclined positions by a pair of cables 85 and 86 cooperating with a winch assembly indicated generally at 87 in FIG. 8. Returning to FIG. 7, cables 85 and 86 are secured to the top of diverter board 81 and threaded through tubular guide and stop members 88 and 89 mounted on opposite legs of stand 27. Members 88 and 89 each have an inwardly directed leg 91 and 91A selectively engageable with the diverter board 81 to function as stops to hold the board in its inclined positions. Extended upwardly from legs 91 and 91A are bodies 92 and 92A secured to the legs of stand 27. The arms 93 and 93A on the upper end of the bodies project toward the winch assembly 87 to locate the cable under the outwardly projected flanges on the top of housing sidewalls 28 and 29.

As shown in FIG. 8, winch assembly 87 is located adjacent stand 27 at the front end of the bunk feeder adjacent hopper 22. The winch assembly 87 comprises a transverse shaft 94 telescoped through a tubular member 96 secured to stand 27. The opposite ends of the shaft 94 project through the tubular member 96 and carry wound ends 97 and 98 of the cables 85 and 86 respectively. The ends 97 and 98 are wound on shaft 94 in opposite directions so that when one cable is wound onto the shaft the opposite cable is unwound from the shaft thereby angularly moving the swingable diverter board 81. A crank 99 is secured to one end of shaft 94 so that the shaft 94 may be manually rotated by use of the crank. The crank 99 may be replaced with a power mechanism, as a gear head motor operated from control box 73.

In use, the swingable diverter board 81 is moved to an inclined position to direct feed either into lots A or C or lots B or D. This is done by rotating the crank of the winch assembly 87 or alternatively, through automatic power controls connected to the control box 73. On energization of the conveyor motor 53 and the depositing of feed into the hopper 22, conveyor 26 moves the feed linearly along the housing 24 progressively depositing feed in an extended uniform ribbon in the reservoir space 31 adjacent the side conveyor 26 and above the gate 36.

To deposit feed in the portion of the bunk 16 facing lot A the feed will engage and move the actuator arm 61A tripping the mercury switch 67A. This will actuate the drive mechanism 39 to move the gate 36 to the open position to dump a substantially continuous ribbon of feed into the bunk 16 facing lot A. Motor 43 of drive mechanism 39 continues to operate until trigger 52 is engaged by the spring finger 48 to complete one revolution thereby returning gate 36 to the closed position.

To deposit feed only in lot C the switch assembly 58 is bypassed in the control box 73 so that the feed moves all of the way down to switch assembly 59 which will affect the operation of the drive mechanism 42 opening the gate 41 under the reservoir space 31 in the outer portion of feeder 15. The switch assemblies 58 and 59 may be independently or concurrently operated to deposit feed in both lots A and C or lots C and D. Alternatively, each lot may be independently supplied with the feed from the feeder 15. In addition, the switch assemblies 58 and 59 are selectively movable on the feeder housing 24 to change the lengths of the ribbons of feed which are deposited in the particular portion of the feed bunk 16. Furthermore, the manually operated switches 73A and 73B can be used to operate the dump motors so that any amount of feed can be deposited in any feed location.

The bunk feeder of this invention has been described for feeding agricultural materials to animals. This use is not to be construed as limiting the invention to bunk feeders or machines which discharge feed to domestic creatures, as livestock, hogs and fowl. The disclosed machine is adapted to operate to convey and deposit bulk materials other than agricultural feeds.

It is apparent many variations and modifications of this invention are here and before set forth may be made by those skilled in the art without departing from the spirit and scope of the invention. For example, the length of the feeder can be increased and additional switch assemblies and drive mechanisms for separate gates can be used to supply feed to additional feeding locations. The invention is limited by the terms of the following claims.

I claim:

1. A multiple lot bunk feeder comprising a housing having a plurality of feed discharge openings to direct feed into feeding locations in a plurality of feedlots, a conveyor located in the housing for moving feed to feed discharge areas in the housing located adjacent the discharge openings, separate movable gate means for closing the discharge openings associated with a feedlot, separate drive means for individually moving the separate gate means from closed positions to open positions whereby feed is discharged to a feeding location associated with a lot and control means for selectively actuating the drive means to move at least one gate means to the open position while other gate means remain in the closed position.

2. The bunk feeder of claim 1 wherein the control means includes separate switch means mounted on the housing responsive to the amount of feed moved into each of the feed discharge areas in the housing, each switch means electrically coupled with the drive means for opening and closing the gate means adjacent each switch means.

3. The bunk feeder of claim 2 wherein each switch means is responsive to the amount of feed moved into the area adjacent the discharge openings and comprises an arm projected downwardly into said area adjacent the side of the conveyor, bracket means secured to the housing adjacent the side of the conveyor, transverse generally horizontal pivot means pivotally mounting the arm on the bracket means, and a position actuated switch mounted on the upper end of the arm, said switch being actuated on upward movement of the lower end of the arm thereby coupling the drive means to a source of electric power.

4. The bunk feeder of claim 2 including means mounting each switch means on the housing in a selected longitudinal position adjacent one side of the conveyor.

5. The bunk feeder of claim 1 wherein the drive means includes gear head motors drivably connected to each of the separate movable gate means and switch controls for each gear head motor for stopping the motor when the associated gate means is in the closed position.

6. The bunk feeder of claim 1 wherein said control means includes means for simultaneously actuating the drive means to concurrently move all the gate means to open and closed positions.

7. The bunk feeder of claim 1 wherein the control means includes separate switch means electrically coupled with the drive means for opening and closing the separate gate means.

8. The bunk feeder of claim 1 including a feed diverter assembly located below said separate gate means, said assembly having a swingable diverter member for selectively directing feed discharged to the opposite sides of the feeding locations.

9. In a bunk feeder, a housing having a feed discharge opening, a conveyor located in the housing, means for moving the conveyor for carrying feed to an area of the housing adjacent the discharge opening, means for dumping feed in said area through the discharge opening, switch means operable to activate the means for dumping the feed from the housing, said switch means having an arm projected downwardly into said area of the housing adjacent the discharge opening and adjacent the side of the conveyor, a bracket means secured to the housing adjacent the side of the conveyor, transverse generally horizontal pivot means pivotally mounting the arm on the bracket means, a position actuated switch mounted on the upper end of the arm, said switch being actuated upon movement of the lower end of the arm thereby activating the means for dumping feed from the housing, said means for dumping feed stored in the area includes a gate movable to a closed position for holding feed in the housing and to an open position allowing feed to discharge from the housing through the discharge opening, a gear head motor drivably connected to the gate for moving the gate to the open and closed positions and a switch control for the gear head motor for stopping the motor when the gate is in the closed position, said switch means operable to activate the gear head motor.

10. In a bunk feeder, a housing having a feed discharge opening, gate means movable to open and closed positions relative to said discharge opening to selectively dump and retain feed in the housing, drive means for moving said gate means, said drive means including a gear head motor drivably connected to the gate means, and a switch control for the gear head motor for stopping the motor when the gate means is in the closed position.

11. The bunk feeder of claim 10 wherein said gear head motor has a drive shaft, a crank arm secured to the drive shaft, a rod connected to the outer end of the crank arm and the gate means, a finger connected to the drive shaft, said switch control having a trigger engageable with the finger to deenergize the motor on each revolution of the drive shaft.

12. The bunk feeder of claim 11 wherein said switch control is mounted on the gear head motor.

13. The bunk feeder of claim 10 including a conveyor located within the housing operable to move feed to the discharge opening, switch means responsive to the amount of feed moved into the area adjacent the discharge opening to connect the gear head motor to a source of electric power whereby the gear motor moves the gate means to the open position dumping feed from the housing.

14. The bunk feeder of claim 10 including a second switch connected to said switch control for connecting the gear head motor to a source of power.

15. In a bunk feeder, a housing having a first generally upright longitudinal sidewall, a second generally upright longitudinal sidewall spaced from the first sidewall, a longitudinal feed discharge opening extended adjacent at least a part of the lower portion of the first sidewall, a conveyor located in the longitudinal space between the first and second sidewalls, said conveyor being laterally spaced from the first sidewall to provide a longitudinal area adjacent the discharge opening, means for moving the conveyor for carrying feed into the area of the housing adjacent the discharge opening, means for dumping feed from said area through the discharge opening, switch means operable to activate the means for dumping the feed from the housing, said switch means having a relatively narrow elongated arm projected downwardly into said housing adjacent the side of the conveyor, said arm having a lower end located in said area of the housing adjacent the discharge opening, means secured to the first sidewall including transverse generally horizontal pivot means pivotally mounting the arm on the first sidewall, and a position actuated switch operatively connected with the arm, said switch being actuated upon movement of the lower end of the arm thereby activating the means for dumping feed from the housing.

16. The feeder of claim 15 wherein said arm has a tubular upper end, said position actuated switch being a mercury switch located within the tubular upper end of the arm.

17. The feeder of claim 15 including an adjustable stop engageable with the arm to hold the arm in a rearwardly and downwardly inclined position.

18. The feeder of claim 15 including bracket means carrying the generally horizontal pivot means, and means to mount the bracket means on the housing whereby the position of the bracket means along the housing can be changed.

19. The feeder of claim 15 wherein said pivot means is connected to the arm between the upper end and lower end of the arm.

20. The feeder of claim 15 wherein: said position actuated switch is a liquid conductor switch movable in response to movement of the arm.

21. The feeder of claim 15 wherein: the means for dumping feed from the area of the housing adjacent the discharge opening includes a gate movable to a closed position for holding feed in the housing and movable to an open position allowing the feed to move from the housing through said discharge opening.

22. The feeder of claim 15 wherein: said arm is an elongated tubular member having a relatively small diameter, the lower end portion of said arm being disposed between the housing and one side of the conveyor.

23. The feeder of claim 22 wherein: said position actuated switch is a liquid conductor switch located in the upper end of the tubular member on the opposite side of the pivot from the lower end of the tubular member.

24. The feeder of claim 15 wherein: said arm is a tubular member having a first generally horizontal portion operatively connected to the generally horizontal pivot means and a second downwardly directed portion extended into the area of the housing adjacent the discharge opening between one side of the conveyor and said housing, said position actuated switch being a liquid conductor switch located in the upper end of the tubular member.